No. 869,867.  
PATENTED OCT. 29, 1907.

E. R. MILLS, C. A. CONN & H. VAN ORMER.  
ROTARY MOTOR.  
APPLICATION FILED DEC. 8, 1906.

3 SHEETS—SHEET 1.

WITNESSES  
W. W. Swartz  
R. A. Balderson

INVENTORS  
E. R. Mills  
C. A. Conn  
H. Van Ormer,  
by Bakewell & Byrnes,  
Attys.

No. 869,867. PATENTED OCT. 29, 1907.
E. R. MILLS, C. A. CONN & H. VAN ORMER.
ROTARY MOTOR.
APPLICATION FILED DEC. 8, 1906.
3 SHEETS—SHEET 2.
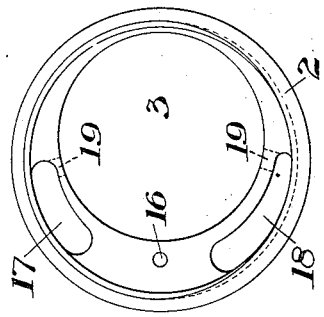
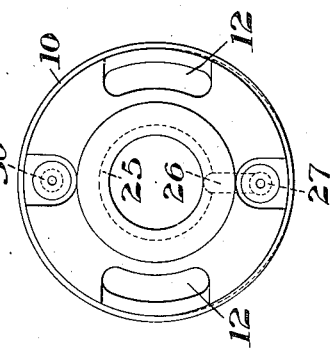
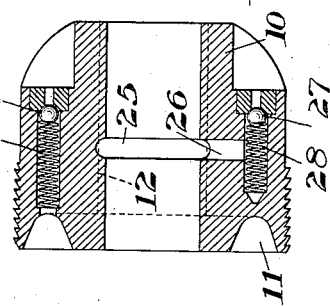
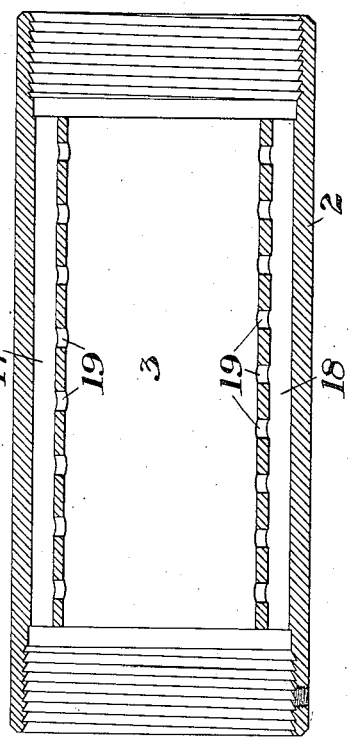
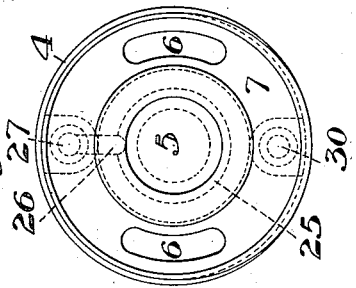
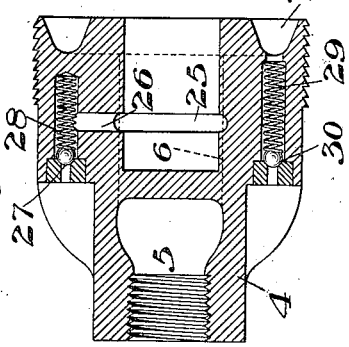
WITNESSES
W. W. Swartz
R. A. Balderson
INVENTORS
E. R. Mills,
C. A. Conn,
H. Van Ormer
by Bakewell & Byrnes,
Attys.

No. 869,867.  
PATENTED OCT. 29, 1907.

E. R. MILLS, C. A. CONN & H. VAN ORMER.  
ROTARY MOTOR.  
APPLICATION FILED DEC. 8, 1906.

3 SHEETS—SHEET 3.

WITNESSES  
W. W. Swartz  
R. A. Balderson

INVENTORS  
E. R. Mills,  
C. A. Conn,  
H. Van Ormer,  
by Bakewell & Byrnes,  
Attys.

UNITED STATES PATENT OFFICE.

EDWARD R. MILLS AND CHARLES A. CONN, OF PITTSBURG, PENNSYLVANIA, AND HERMAN VAN ORMER, OF HARTFORD, CONNECTICUT, ASSIGNORS TO LIBERTY MANUFACTURING COMPANY, OF PITTSBURG, PENNSYLVANIA, A CORPORATION OF PENNSYLVANIA.

ROTARY MOTOR.

No. 869,867.      Specification of Letters Patent.      Patented Oct. 29, 1907.

Application filed December 8, 1906. Serial No. 346,927.

*To all whom it may concern:*

Be it known that we, EDWARD R. MILLS and CHARLES A. CONN, both of Pittsburg, Allegheny county, Pennsylvania, and HERMAN VAN ORMER, of Hartford, Hartford county, Connecticut, have invented a new and useful Improvement in Rotary Motors, of which the following is a full, clear, and exact description, reference being had to the accompanying drawings, forming part of this specification, in which—

Figure 1:
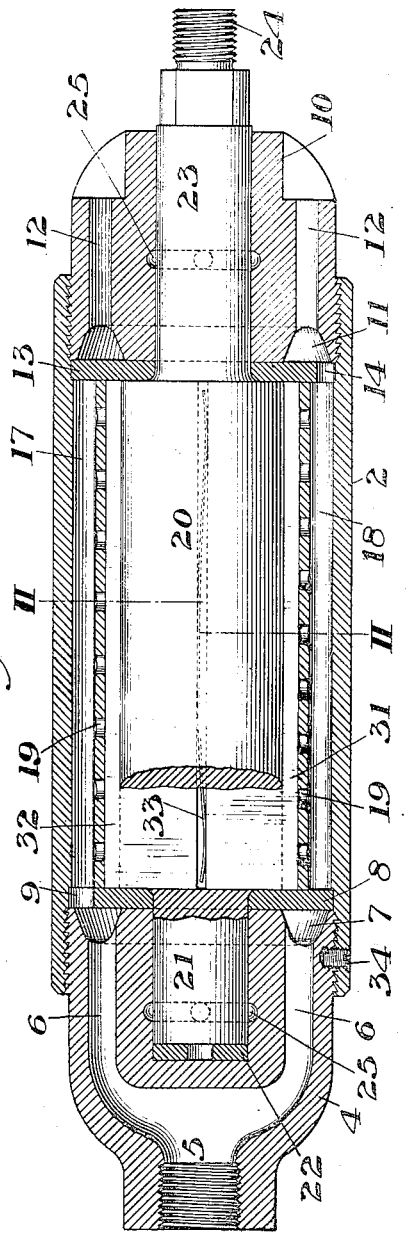
Figure 4:
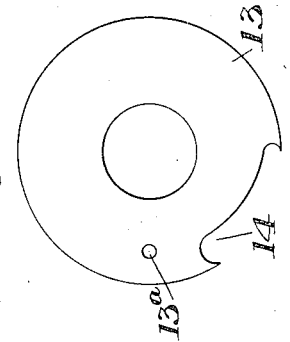
Figure 2:
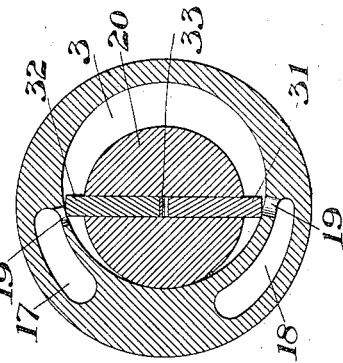
Figure 3:
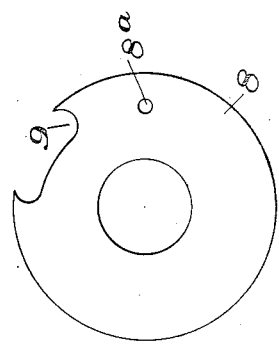
Figure 11:
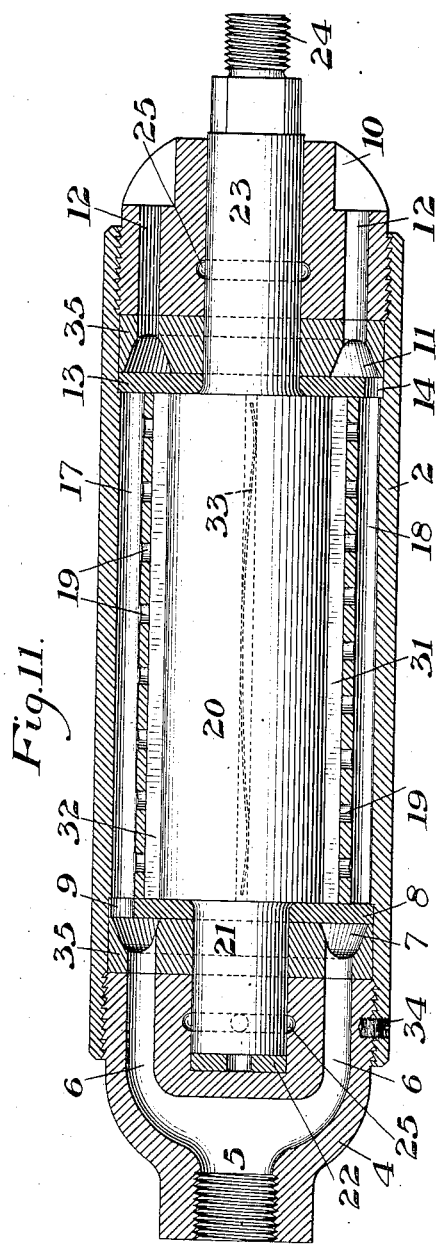

Figure 1 is a longitudinal section of a motor embodying our invention; Fig. 2 is a transverse section of the same on the line II—II of Fig. 1; Fig. 3 is a detail view of the admission plate or disk; Fig. 4 is a similar view of the exhaust plate or disk; Fig. 5 is a longitudinal section of the cylinder with the other parts removed therefrom; Fig. 6 is an end view of the same; Fig. 7 is a detail sectional view of the admission head; Fig. 8 is an end view of the same; Fig. 9 is a detail sectional view of the exhaust head; Fig. 10 is an end view of the same; and Fig. 11 is a view similar to Fig. 1 but showing a modification.

Our invention has relation to motors, and more particularly to motors for operating small tools such as boiler tube cleaning tools, in which the motor is carried through the tube to be cleaned with the tool, although it may be used for various other purposes.

The invention is particularly designed to provide a motor which shall be capable of operation by compressed air; which shall be capable of a high speed of operation; which shall be of compact construction; and of high general efficiency.

With these objects in view, the invention consists in the novel construction, arrangement and combination of parts all substantially as hereinafter described and pointed out in the appended claims.

In the drawing, the numeral 2 designates the cylinder of the motor, which is made of considerable length, and in which is an eccentrically located cylindrical piston chamber 3.

4 is an admission head threaded or otherwise secured in one end portion of the cylinder, and which is shown as having an inlet port 5 adapted to be connected with a suitable source of power. The port 5 is formed within the head 4 with two or more branches 6 which communicate at their inner ends with an annular port or chamber 7, whose inner wall is formed by an admission plate or disk 8 having therein an admission port or opening 9. 10 is an exhaust head which is screwed or otherwise secured in the opposite end portion of the cylinder 2, and which is formed at its inner end with an annular chamber 11 from which lead outwardly to the outer end of the head, two or more exhaust ports or passages 12. The inner wall of the annular chamber 11 is formed by an exhaust plate or disk 13 having therein an exhaust port or opening 14. The two plates or disks 8 and 13 are secured against rotation by any suitable means, such as a pin inserted through a hole 8ª, or 13ª, in the disk, and into a corresponding hole 16, (Fig. 6), in the eccentric wall of the cylinder 2.

The admission port 9 of the plate or disk 8 communicates with a longitudinally extending port 17 in the wall of the cylinder 2, and the port 14 in the disk or plate 13 communicates with a port 18 which extends longitudinally of the cylinder at the opposite side of the cylinder from the port 17. These two ports are shown as extending the full length of the cylinder between the disks or plates 13, and each of them has a plurality of openings or passages 19 which extend therefrom into communication with the piston chamber 3.

20 designates the cylindrical piston, which is placed eccentrically in the chamber 3. This piston is formed at one end with a short shaft projection 21, which is journaled in a bearing provided therefor in the admission head 4, a thrust bearing or washer 22 being provided for the end of the shaft. The other end of the piston has a shaft 23, which is journaled in the exhaust head 10 through which it extends, its outer projecting end being provided with means such as the screw-threaded shank 24, for the connection therewith of a suitable tool.

25 designate lubricating grooves or passages, for the piston shaft bearings, said passages having feed openings 26 which extend outwardly through the admission and exhaust heads respectively and are normally closed by means of suitable check valves 27 held seated by springs 28. The admission and exhaust heads are also formed with the lubricating passages 29, by means of which a lubricant may be introduced into the annular chambers 7 and 11. The passages 29 are normally closed by spring-seated check valves 30 similar to the valves 27.

Seated in the rotary piston 20 are the oppositely directed vanes or blades 31 and 32. These vanes or blades are arranged to move freely in the piston, a leaf spring 33 being seated between them for the purpose of maintaining contact between their outer edges and the walls of the piston chamber 3.

The admission and exhaust heads may be firmly secured in the ends of the cylinder by any suitable means as by small screw-studs 34.

The construction shown in Fig. 11 is similar to that shown in the other figures, with the exception that the portions 35 which carry the annular chambers 7 and 11, instead of being formed as an integral part of the admission and exhaust heads respectively, are formed in separate pieces which are seated between the said heads and the admission and exhaust plates, the purpose of this construction being to provide for the ready removal and renewal of these portions of the motor in case of undue wear.

The operation is as follows:—Pressure is admitted through the ports 5 and 6 into the annular chamber 7, and thence into the admission port 17, and into the piston chamber 3 through the plurality of passages 19, at different points in the length of said chamber. This pressure being admitted behind one of the piston vanes or blades, causes the rotation of the same, the pressure following the blade until the exhaust openings 19 are uncovered thereby, at which time the entering pressure is behind the opposite vane or blade. In this manner, a constant high speed rotation is maintained.

The advantages of our invention consist in the arrangement of the piston cylinder and admission ports in the manner described, whereby a high speed of rotation may be obtained; in the simple and compact construction and arrangements of the parts whereby a motor is provided which can be operated in a small space such as the interior of a boiler tube; and in the construction described, in which the parts can be readily removed and in which all the parts are accessible for renewal or repairs.

Various changes may be made in the details of construction and arrangement by those skilled in the art, without departing from the spirit and scope of our invention.

What we claim is:—

1. In a motor, a cylinder having a longitudinal piston chamber, admission and exhaust ports in the walls of the cylinder and communicating with the piston chamber at different points throughout its length, detachable ported admission and exhaust heads closing the ends of the cylinder, and a rotary piston journaled in the admission and exhaust heads, substantially as described.

2. In a motor, a cylinder having a piston chamber therein eccentric to the longitudinal axis of the cylinder and also having longitudinally extending admission and exhaust ports in its wall which communicate with said chamber at a plurality of different points, and detachable ported admission and exhaust heads closing the ends of the cylinder and having their ports communicating with the longitudinally extending admission and exhaust ports, said heads also carrying bearings for the rotary piston, substantially as described.

3. In a motor, a cylinder having a piston chamber therein, a rotary piston, longitudinally extending admission and exhaust ports, each communicating with the cylinder at a plurality of points throughout its length, and ported admission and exhaust heads closing the ends of the cylinder and removably secured thereto and carrying bearings for the rotary piston; substantially as described.

4. In a motor, a cylinder having an eccentric piston chamber therein and longitudinally extending admission and exhaust ports communicating with said chamber at different points along its length, a removable ported admission head closing one end of the cylinder, a removable ported exhaust head closing the opposite end of the cylinder, said heads having bearings for the piston, and ported admission and exhaust plates or disks intermediate the respective heads in the ends of the piston; substantially as described.

5. In a motor, a cylinder having a longitudinally extending piston chamber, admission and exhaust ports extending parallel with said chamber and communicating therewith at a plurality of points, ported admission and exhaust heads closing the ends of said cylinder and having their ports arranged to communicate respectively with the admission and exhaust ports of the cylinder, and a rotary piston, having journal portions provided with bearings in the said heads, and means for lubricating said bearings; substantially as described.

6. In a motor, a cylinder having a longitudinally extending piston chamber therein, admission and exhaust ports parallel with the chamber and communicating therewith at a plurality of points, an admission head closing one end of the cylinder and having an annular port or chamber at its inner end, and a ported admission plate forming the inner wall of said port or chamber with its port connecting the same with the admission port of the chamber; substantially as described.

7. In a motor, a cylinder having a longitudinal piston chamber, admission and exhaust ports extending parallel with the chamber and communicating therewith at different points throughout its length, a rotary piston in said chamber, means for admitting pressure to the admission port of the cylinder, and an exhaust head closing the exhaust end of the cylinder and having an annular port or passage at its inner end and an exhaust plate or disk forming the inner wall of said chamber and having a port which connects the same with the exhaust port of the cylinder; substantially as described.

8. In a motor, a cylinder having a longitudinal piston chamber, admission and exhaust ports in the walls of the cylinder and communicating with the piston chamber at different points throughout its length, ported admission and exhaust heads closing the ends of the cylinder, a rotary piston journaled in the admission and exhaust heads, and means for lubricating the piston journals; substantially as described.

9. In a motor, a cylinder having a piston chamber eccentric to the longitudinal axis of the cylinder and also having longitudinally extending admission and exhaust ports in its wall which communicate with said chamber at a plurality of different points, detachable heads closing the ends of said cylinder and having ports which communicate respectively with the longitudinally extending admission and exhaust ports, the rear head having means for the attachment thereto of a fluid supply pipe, and a rotary piston journaled in said heads, said piston having one of its journals extended through the front head and provided with means for attaching a tool thereto, substantially as described.

10. In a motor, a cylinder having a piston chamber eccentric to the longitudinal axis of the cylinder and also having longitudinally extending admission and exhaust ports in its wall which communicate with said chamber at a plurality of different points, heads detachably secured to said cylinder and closing its end portions, said heads having respectively admission and exhaust ports therein in communication with the longitudinal ports in the cylinder wall, a rotary piston journaled in said heads, and means in the rear head for taking the end thrust of the piston, substantially as described.

11. In a motor of the character described, a cylinder having a piston chamber therein and also having longitudinally extending admission and exhaust ports at its wall which communicate with said chamber at a plurality of different points, and heads closing the ends of said cylinder and detachably secured thereto, said heads having ports which communicate with the respective ports in the cylinder and being of an exterior diameter different from that of the cylinder, substantially as described.

12. In a motor of the character described, a cylinder having a piston chamber therein and also having longitudinally extending admission and exhaust ports in its wall which communicate with said chamber at a plurality of different points, and heads closing the ends of said cylinder and detachably secured thereto, said heads having ports which communicate with the respective ports in the cylinder and having a cylindrical cross section at all points, substantially as described.

13. In a motor, a cylinder having a piston chamber therein and also having longitudinally extending admission and exhaust ports in its wall which communicate with said chamber at a plurality of different points throughout its length, ported heads secured to and closing the ends of the cylinder, a rotary piston journaled within the said heads, and means for lubricating the piston journals and also the cylinder, substantially as described.

14. In a motor, a cylinder having a piston chamber therein and also having longitudinally extending admission and exhaust ports in its wall which communicate with said chamber, at a plurality of different points throughout its length, ported heads secured to and closing the ends of the cylinder, and a rotary piston journaled within the said heads, the bearings for the piston having openings communicating therewith and leading outwardly through the heads, substantially as described.

15. In a motor, a cylinder having a piston chamber therein and also having longitudinally extending admission and exhaust ports in its walls which communicate with said chamber at a plurality of different points, the centers of said ports being less than 180° from each other, ported heads detachably secured to and closing the ends of the cylinder, and a rotary piston journaled in said heads and having a single slot extending diametrically therethrough to seat a piston blade, substantially as described.

16. In a motor, a cylinder having a piston chamber therein and also having longitudinally extending admission and exhaust ports in its wall which communicate with said cylinder at a plurality of different points, ported admission and exhaust heads closing the ends of the cylinder and detachably secured thereto, a rotary piston journaled in the admission and exhaust ports, and means for connecting a supply pipe to one of said heads, substantially as described.

17. In a motor, a cylinder having a longitudinal piston chamber, admission and exhaust ports in the walls of the cylinder communicating with the piston chamber at different points throughout its length, ported admission and exhaust heads closing the ends of the cylinder and detachably secured thereto, and a rotary piston journaled in the admission and exhaust heads, the admission head having a space or chamber therein at the rear end of the piston journal, substantially as described.

In testimony whereof, we have hereunto set our hands.

E. R. MILLS.
CHARLES A. CONN.
HERMAN VAN ORMER.

Witnesses as to E. R. Mills and C. A. Conn:
 H. M. CORWIN,
 M. V. KIEHL.
Witnesses as to H. Van Ormer:
 W. J. WELCH,
 MARTIN V. SMITH.